(12) United States Patent
Kwon

(10) Patent No.: US 12,372,753 B2
(45) Date of Patent: Jul. 29, 2025

(54) IMAGING LENS

(71) Applicant: LG INNOTEK CO., LTD., Seoul (KR)

(72) Inventor: Duk Keun Kwon, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 709 days.

(21) Appl. No.: 17/762,190

(22) PCT Filed: Oct. 8, 2020

(86) PCT No.: PCT/KR2020/013806
§ 371 (c)(1),
(2) Date: Mar. 21, 2022

(87) PCT Pub. No.: WO2021/071320
PCT Pub. Date: Apr. 15, 2021

(65) Prior Publication Data
US 2022/0382020 A1 Dec. 1, 2022

(30) Foreign Application Priority Data

Oct. 8, 2019 (KR) .......................... 10-2019-0124711

(51) Int. Cl.
*G02B 13/00* (2006.01)
*G02B 3/12* (2006.01)
(Continued)

(52) U.S. Cl.
CPC ........... *G02B 13/0045* (2013.01); *G02B 3/12* (2013.01); *G02B 9/62* (2013.01); *H04N 23/54* (2023.01); *H04N 23/55* (2023.01)

(58) Field of Classification Search
CPC ... G02B 9/60; G02B 9/62; G02B 9/64; G02B 13/00; G02B 13/04; G02B 13/0045;
(Continued)

(56) References Cited

U.S. PATENT DOCUMENTS

2005/0200973 A1\* 9/2005 Kogo ................... G02B 26/004
359/689
2007/0229970 A1 10/2007 Kim
2007/0247727 A1 10/2007 Kim

FOREIGN PATENT DOCUMENTS

CN 1940632 A 4/2007
CN 201527509 U 7/2010
(Continued)

OTHER PUBLICATIONS

English translation of JPH05210047 (Year: 1993).\*
English translation of JP2009216946 (Year: 2009).\*

*Primary Examiner* — Jie Lei
(74) *Attorney, Agent, or Firm* — Birch, Stewart, Kolasch & Birch, LLP

(57) ABSTRACT

An embodiment of the present invention relates to an imaging lens comprising: a first lens having positive (+) refractive power; a second lens having negative (−) refractive power; a third lens having negative (−) refractive power; a fourth lens; a fifth lens having negative (−) refractive power; and a sixth lens, wherein the first to sixth lenses are successively arranged from an object side to an image side, the first to third, fifth, and sixth lenses are solid lenses, and the fourth lens comprises a focus-tunable lens.

20 Claims, 4 Drawing Sheets

(51) Int. Cl.
*G02B 9/62* (2006.01)
*H04N 5/225* (2006.01)
*H04N 23/54* (2023.01)
*H04N 23/55* (2023.01)

(58) Field of Classification Search
CPC ............ G02B 13/0075; G02B 13/0015; G02B 13/009; G02B 13/001; G02B 13/06; G02B 13/18; G02B 2003/0093; G02B 7/02; G02B 7/04; G02B 3/04; G02B 3/12; G02B 3/14; G02B 27/00; G02B 27/0025; G02B 5/00; G02B 5/20; G02B 5/208; H04N 23/54; H04N 23/55
USPC ....... 359/756, 752, 757, 758, 713, 728, 739, 359/682, 658
See application file for complete search history.

(56) References Cited

FOREIGN PATENT DOCUMENTS

| | | | |
|---|---|---|---|
| CN | 106125267 A | 11/2016 | |
| CN | 108873129 A | 6/2017 | |
| CN | 108254855 A | 7/2018 | |
| CN | 207718066 U | 8/2018 | |
| CN | 108627951 A | 10/2018 | |
| CN | 109471251 A | 3/2019 | |
| CN | 109844575 A | 6/2019 | |
| CN | 209167663 U | 7/2019 | |
| EP | 3508911 A1 | 7/2019 | |
| JP | 5-210047 A | 8/1993 | |
| JP | 2009216946 * | 9/2009 | ............... G02B 1/00 |
| JP | 2012-103626 A | 5/2012 | |
| KR | 10-0714583 B1 | 5/2007 | |
| KR | 10-2007-0103812 A | 10/2007 | |
| KR | 10-2018-0092358 A | 8/2018 | |
| WO | WO 2018/194195 A1 | 10/2018 | |

* cited by examiner

IMAGING LENS

CROSS REFERENCE TO RELATED APPLICATIONS

This application is the National Phase of PCT/KR2020/013806 filed on Oct. 8, 2020, which claims priority under 35 U.S.C. § 119 (a) to Patent Application No. 10-2019-0124711 filed in the Republic of Korea on Oct. 8, 2019, all of which are hereby expressly incorporated by reference into the present application.

TECHNICAL FIELD

The present invention relates to an imaging lens.

BACKGROUND ART

Recently, in relation to an image pick-up system, a camera module for a communication terminal, a digital still camera (DSC), a camcorder, a PC camera (imaging device attached to a personal computer), and the like are being studied. The most important component for the camera module associated with such an image pickup system to obtain an image is an imaging lens for forming an image.

Portable terminals such as mobile phones or vehicle cameras are gradually becoming smaller and/or lighter. In line with this trend, imaging lenses are also becoming smaller. In addition, in addition to implementing the imaging lens small, high performance of the imaging lens is also required in response to the high performance of the light receiving element.

A conventional imaging lens acquires a high-resolution image through an auto-focusing (AF) function or an optical image stabilizer (OIS) function. The autofocus function and the handshake correction function are performed by moving or tilting the plurality of solid lenses in an optical axis or a direction perpendicular to the optical axis, and a separate lens driving device for driving the solid lens is used.

However, the lens driving device consumes high power, requires a driving member such as a magnet or a coil to drive the lens, and requires a space corresponding to the driving range of the lens, and there is a problem in that the size of the camera module and optical device become increasing.

DETAILED DESCRIPTION OF THE INVENTION

Technical Subject

An embodiment of the present invention is to provide a high resolution and miniaturized imaging lens.

In addition, it is intended to provide an imaging lens having an excellent aberration characteristics and good aberration correction capability.

Technical Solution

An imaging lens according to an embodiment of the present invention comprises: a first lens having positive (+) refractive power; a second lens having negative (−) refractive power; a third lens having negative (−) refractive power; a fourth lens; a fifth lens having negative (−) refractive power; and a sixth lens, wherein the first to sixth lenses are successively disposed from an object side to an image side, wherein the first to third, fifth, and sixth lenses are solid lenses, and wherein the fourth lens may comprise a focus-tunable lens.

In addition, the sixth lens may have positive (+) refractive power.

In addition, an aperture disposed between the second lens and the third lens may be comprised.

In addition, the object side surface of the first lens may be convex and the image side surface of the first lens may be concave.

In addition, the object side surface of the second lens may be convex and the image side surface of the second lens may be concave.

In addition, the object side surface of the third lens may be convex and the image side surface of the third lens may be concave.

In addition, both surfaces of the fifth lens may be concave in the optical axis.

In addition, the object side surface of the sixth lens may be concave in the optical axis and the image side surface of the sixth lens may be convex.

In addition, the refractive power of the fourth lens may be varied within a range of −50 diopters to 100 diopters.

In addition, the focus-tunable lens may comprise a liquid lens. The liquid lens comprises a first plate, a second plate spaced apart from the first plate and disposed closer to an image side of the first plate, a first liquid disposed between the first plate and the first plate and having conductivity, and a second liquid disposed between the first plate and the second plate and having non-conductivity, wherein the liquid lens comprises an interface being formed as the first liquid and the second liquid are being in contact with each other, wherein the curvature of the interface of the liquid lens may be varied by an applied voltage, and wherein the first plate and the second plate may be formed as a flat plate.

In addition, the imaging lens may satisfy Conditional Expression 1 below.

$$F1/TTL > 0.4 \qquad \text{[Conditional Expression 1]}$$

(In Conditional Expression 1 described above, F1 means the focal length of the first lens, and TTL means the distance from the vertex of the object side surface of the first lens to the imaging plane in the optical axis.)

In addition, the imaging lens may satisfy Conditional Expression 2 below.

$$THI > 0.5 \text{ mm} \qquad \text{[Conditional Expression 2]}$$

(In Conditional Expression 2 described above, THI means the distance from the vertex of the image side surface of the third lens to the vertex of the object side surface of the fifth lens in the optical axis.)

In addition, the imaging lens may satisfy Conditional Expression 3 below.

$$THI/TTL > 0.1 \qquad \text{[Conditional Expression 3]}$$

(In Conditional Expression 3 described above, THI means the distance from the vertex of the image side surface of the third lens to the vertex of the object side surface of the fifth lens in the optical axis, and TTL means the distance from the vertex of the object side surface of the first lens to the imaging surface in the optical axis.)

In addition, the imaging lens may satisfy Conditional Expression 4 below.

$$THI/(Y \times 2) > 0.1 \qquad \text{[Conditional Expression 4]}$$

(In Conditional Expression 4 described above, THI means the distance from the vertex of the image side surface of the third lens to the vertex of the object side surface of the fifth lens in the optical axis, and Y means the distance from the optical axis of the imaging plane to the maximum image height in the vertical direction.)

In addition, the imaging lens may satisfy the Conditional Expression 5 below.

$$F/TTL>1 \quad \text{[Conditional Expression 5]}$$

(In Conditional Expression 5 described above, F means the entire focal length of the optical system, and TTL means the distance from the vertex of the object side surface of the first lens to the imaging plane in the optical axis.)

In addition, the following Conditional Expression 6 can be satisfied.

$$0.5<TTL/(Y\times 2)<2 \quad \text{[Conditional Expression 6]}$$

(In Conditional Expression 6 described above, TTL means the distance from the vertex of the object side surface of the first lens to the imaging plane optical axis, and Y means the distance from the optical axis of the imaging plane to the maximum image height in the vertical direction.)

In addition, the following Conditional Expression 7 can be satisfied.

$$|R2|>2\times|R1| \quad \text{[Conditional Expression 7]}$$

(In Conditional Expression 7 described above, R1 means the radius of curvature of the object side surface of the first lens, and R2 means the radius of curvature of the image side surface of the first lens.)

In addition, the imaging lens may satisfy Conditional Expression 8 below.

$$|R3|/|R4|>1 \quad \text{[Conditional Expression 8]}$$

(In Conditional Expression 8 described above, R3 means the radius of curvature of the object side surface of the second lens, and R4 means the radius of curvature of the image side surface of the second lens.)

In addition, the imaging lens may satisfy Conditional Expression 9 below.

$$|R5|/|R6|>1 \quad \text{[Conditional Expression 9]}$$

(In Conditional Expression 9 described above, R5 means the radius of curvature of the object side surface of the third lens, and R6 means the radius of curvature of the image side surface of the third lens.)

In addition, the imaging lens may satisfy Conditional Expression 10 below.

$$-0.05<Power4<0.1 \quad \text{[Conditional Expression 10]}$$

(In Conditional Expression 10 described above, Power4 means the reciprocal of the focal length of the fourth lens.)

A camera module according to an embodiment of the present invention comprises an image sensor; the imaging lens; and a filter being disposed between the image sensor and the imaging lens.

A smartphone according to an embodiment of the present invention may comprise the camera module.

Advantageous Effects

Through an embodiment of the present invention, it is possible to provide a high resolution and miniaturized imaging lens.

In addition, it is possible to provide an imaging lens with excellent aberration characteristics and good aberration correction capability.

BEST MODE

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (comprising technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may comprise the plural form unless specifically stated in the phrase, and when described as "at least one (or more than one) of A and B and C", it may comprise one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also comprise cases of being 'connected', 'coupled', or 'interconnected' due that another component between that other components.

In addition, when described as being formed or disposed in "on (above)" or "below (under)" of each component, "on (above)" or "below (under)" means that it comprises not only the case where the two components are directly in contact with, but also the case where one or more other components are formed or disposed between the two components. In addition, when expressed as "on (above)" or "below (under)", the meaning of not only an upward direction but also a downward direction based on one component may be comprised.

Hereinafter, in describing the configuration of each lens, the term 'object side surface' refers to the surface of the lens facing the object, and the term 'image side' refers to the surface of the lens facing the imaging plane.

Units of length, distance, radius of curvature, thickness, and the like being used hereinafter may be mm.

Figure 1:
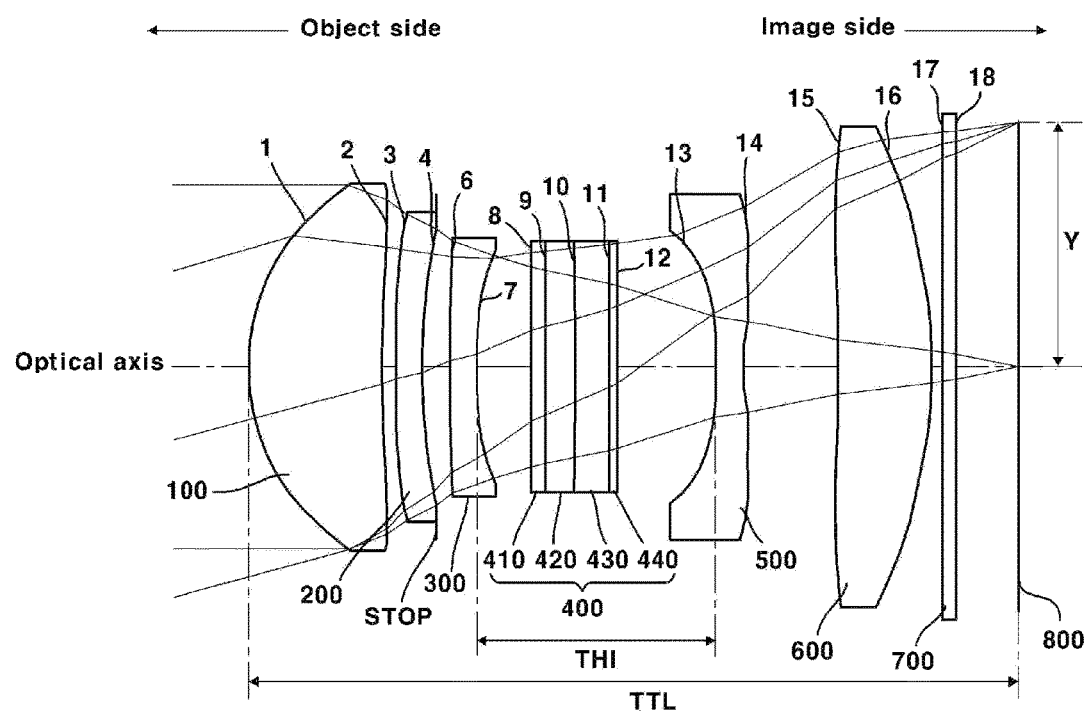
FIG. 1 is a block diagram of an imaging lens according to a first embodiment of the present invention.

Hereinafter, the configuration of the imaging lens according to the first embodiment of the present invention will be described with reference to the drawings. FIG. 1 is a block diagram of an imaging lens according to a first embodiment of the present invention.

An imaging lens according to a first embodiment of the present invention may comprise a plurality of lenses. The imaging lens may comprise six lenses. The imaging lens may comprise a first lens 100, a second lens 200, a third lens 300, a fourth lens 400, a fifth lens 500, a sixth lens 600, and an aperture STOP. However, in an imaging lens according to the first embodiment, any one or more among the first lens 100, the second lens 200, the third lens 300, the fourth lens 400, the fifth lens 500, the sixth lens 600, and the aperture STOP may be omitted. The imaging lens may be disposed with the first lens 100, the second lens 200, the aperture STOP, the third lens 300, the fourth lens 400, the fifth lens 500, and the sixth lens 600 in order from the object side to the image side. The imaging lens according to a first embodiment may be composed of 5 or less lenses. Or, the imaging lens according to the first embodiment may be composed of seven or more lenses.

In another embodiment, any one or more among another lens, a flat plate, and an optical member may be added between the first lens 100 to the sixth lens 600. In addition, any one or more among another lens, a flat plate, and an optical member may be added in front of the first lens 100 or behind the sixth lens 600. In addition, any one or more among another lens, a flat plate, and an optical member may be added between the aperture STOP and the lens, between the lens and the filter 700, and between the filter 700 and the image sensor 800. In this case, the filter 700 may be a flat lens. The refractive power of the flat lens may be '0'. The refractive power of a flat lens may not exist. In addition, a filter layer may be disposed between the aperture STOP and the lens, between the lens and the filter 700, and between the filter 700 and the image sensor 800. In this case, the filter layer can be coated to become a filter.

The imaging lens may comprise the first lens 100. The first lens 100 may be closest to the object side. The first lens 100 may be a lens disposed first on the object side. The first lens 100 may be a lens that is first adjacent to the object side. A lens may be additionally disposed between the first lens 100 and the second lens 200. The second to fifth lenses 200, 300, 400, and 500 may be disposed between the first lens 100 and the sixth lens 600. Lenses other than the second to fifth lenses 200, 300, 400, and 500 may be additionally disposed between the first lens 100 and the sixth lens 600. A lens may be additionally disposed between at least two of the first to sixth lenses 100, 200, 300, 400, 500 and 600.

The first lens 100 may have positive (+) refractive power. The first lens 100 may be formed to have a convex object side surface. The first lens 100 may be formed to have an object side surface convex in the optical axis. The first lens 100 may comprise an object side surface having a convex shape. The first lens 100 may comprise an object side surface having a convex shape in the optical axis. The first lens 100 may be formed to have a concave image side surface. The first lens 100 may be formed to have an image side concave in the optical axis. The first lens 100 may comprise an image side surface having a concave shape. The first lens 100 may comprise an image side surface having a concave shape in the optical axis. The first lens 100 may be formed in a meniscus shape in which an object side surface is convex. The first lens 100 may be formed in a meniscus shape in which an object side surface is convex in the optical axis.

The radius of curvature of the object side surface of the first lens 100 may be positive. The radius of curvature of the object side surface of the first lens 100 in the optical axis may be positive. The radius of curvature of the image side of the first lens 100 may be positive. The radius of curvature of the image side of the first lens 100 in the optical axis may be positive. The radius of curvature of the object side surface of the first lens 100 may be smaller than the radius of curvature of the image side surface of the first lens 100. The first lens 100 may be a solid lens.

The first lens 100 may satisfy a range of $1.5<N1<1.6$. In addition, the first lens 100 may satisfy a range of $1.51<N1<1.55$. N1 is a refractive index of the first lens 100. The first lens 100 may satisfy a range of $50<V1<60$. In addition, the first lens 100 may satisfy the range of $53<V1<58$. V1 is an Abbe number (Abbe #) of the first lens 100.

The imaging lens may comprise the second lens 200. The second lens 200 may be a lens disposed second from the object side. The second lens 200 may be a lens that is second adjacent to the object side. The second lens 200 may be disposed between the first lens 100 and the image side. The second lens 200 may be disposed between the first lens 100 and the third lens 300. A lens may be additionally disposed between the second lens 200 and the first lens 100 or between the second lens 200 and the third lens 300.

The second lens 200 may have negative (−) refractive power. The second lens 200 may be formed to have a convex object side surface. The second lens 200 may be formed to have an object side surface convex in the optical axis. The second lens 200 may comprise an object side surface having a convex shape. The second lens 200 may comprise an object side surface having a convex shape in the optical axis. The second lens 200 may be formed to have a concave image side surface. The second lens 200 may be formed to have an image side concave in the optical axis. The second lens 200 may comprise an image side surface having a concave shape. The second lens 200 may comprise an image side surface having a concave shape in the optical axis. The second lens 200 may be formed in a meniscus shape in which an object side surface is convex. The second lens 200 may be formed in a meniscus shape in which an object side surface is convex in the optical axis.

The radius of curvature of the object side surface of the second lens 200 may be positive. The radius of curvature in the optical axis of the object side surface of the second lens 200 may be positive. The radius of curvature of the image side surface of the second lens 200 may be positive. The radius of curvature of the image side of the second lens 200 in the optical axis may be positive. The radius of curvature of the object side surface of the second lens 200 may be greater than the radius of curvature of the image side surface of the second lens 200. The second lens 200 may be a solid lens.

The second lens 100 may satisfy a range of $1.6<N2<1.7$. In addition, the second lens 200 may satisfy the range of $1.64<N2<1.68$. N2 is a refractive index of the second lens 200. The second lens 200 may satisfy a range of $20<V2<30$. In addition, the second lens 200 may satisfy the range of $20<V2<25$. V2 is the Abbe number (Abbe #) of the second lens 200.

The imaging lens may comprise a third lens 300. The third lens 300 may be a lens disposed third from the object side. The third lens 300 may be a lens that is third adjacent to the object side. The third lens 300 may be disposed between the second lens 200 and the image side. The third lens 300 may be disposed between the second lens 200 and the fourth lens 400. A lens may be additionally disposed between the third lens 300 and the second lens 200 or between the third lens 300 and the fourth lens 400.

The third lens 300 may have negative (−) refractive power. The third lens 300 may be formed to have a convex object side surface. The third lens 300 may be formed to have an object side surface convex in the optical axis. The third lens 300 may comprise an object side surface having a convex shape. The third lens 300 may comprise an object side surface having a convex shape in the optical axis. The third lens 300 may be formed to have a concave image side surface. The third lens 300 may be formed to have an image side concave in the optical axis. The third lens 300 may comprise an image side surface having a concave shape. The third lens 300 may comprise an image side surface having a concave shape in the optical axis.

The radius of curvature of the object side surface of the third lens 300 may be positive. The radius of curvature of the object side surface of the third lens 300 in the optical axis may be positive. The radius of curvature of the image side surface of the third lens 300 may be positive. The radius of curvature of the image side of the third lens 300 in the optical axis may be positive. The radius of curvature of the object side surface of the third lens 300 may be greater than the radius of curvature of the image side surface of the third lens 300. The third lens 300 may be a solid lens.

The third lens 300 may satisfy a range of 1.6<N3<1.7. In addition, the third lens 300 may satisfy the range of 1.64<N3<1.68. N3 is a refractive index of the third lens 300. The third lens 300 may satisfy a range of 20<V3<30. In addition, the third lens 300 may satisfy a range of 20<V3<25. V3 is an Abbe number (Abbe #) of the third lens 300.

The imaging lens may comprise a fourth lens 400. The fourth lens 400 may be a lens to be disposed fourth from the object side. The fourth lens 400 may be a lens that is fourth adjacent to the object side. The fourth lens 400 may be a lens disposed third from the image side. The fourth lens 400 may be a third adjacent lens from the image side. The fourth lens 400 may be disposed between the third lens 300 and the image side. The fourth lens 400 may be disposed between the third lens 300 and the fifth lens 500. A lens may be additionally disposed between the fourth lens 400 and the third lens 300 or between the fourth lens 400 and the fifth lens 500.

The fourth lens 400 may comprise a focus-tunable lens. A focus-tunable lens may comprise a variable lens surface. The focus-tunable lens may comprise a liquid lens. The fourth lens 400 may comprise a liquid lens. The liquid lens may be a liquid lens containing two types of liquid. A liquid lens comprising two types of liquids may comprise a conductive liquid and a non-conductive liquid. In this case, the focus may be changed by adjusting the interface between the conductive liquid and the non-conductive liquid using a voltage applied to the liquid lens. The liquid lens may be disposed between the third lens 300 and the fifth lens 500. The liquid lens may be disposed between the solid lenses. The liquid lens may be spaced apart from the solid lens. The liquid lens may be a variable lens. The liquid lens may be an autofocus lens.

The liquid lens may comprise a first liquid 420. The first liquid 420 may be disposed between the first plate 410 and the second plate 440. The first liquid 420 may have conductivity. The first liquid 420 may be in contact with the second liquid 430. The image side surface of the first liquid 420 may be in contact with the object side surface of the second liquid 430. The liquid lens may comprise a second liquid 430. The second liquid 430 may be disposed between the first plate 410 and the second plate 440. The second liquid 430 may have non-conductivity. As a modified embodiment, the first liquid 420 has non-conductivity and the second liquid 430 may have conductivity.

The liquid lens may comprise an interface. The interface may be formed by being in contact with the first liquid 420 and the second liquid 430. The interface may be formed by being in contact with the image side of the first liquid 420 and the object side of the second liquid 430. The interface may be a refractive surface. The curvature of the interface may be varied by a voltage being applied thereto.

In a modified embodiment, the liquid lens may be a liquid lens containing one type of liquid. A liquid lens comprising one type of liquid may change the focus by adjusting a membrane disposed at a position corresponding to the liquid. For example, the focus can be changed by pressing the membrane by the electromagnetic force of the magnet and coil. Or, the liquid lens 310 may be a liquid lens comprising three or more types of liquids.

The liquid lens may comprise a terminal. A liquid lens whose focal length is adjusted in response to a driving voltage may receive an operating voltage through a terminal. The terminal of the liquid lens may comprise an individual terminal and a common terminal. The individual terminal may comprise four individual terminals disposed at the four corners of the liquid lens. The individual terminal may be disposed on a first surface of the liquid lens. The common terminal may comprise four common terminals disposed at four corners of the liquid lens. The common terminal may be disposed on a second surface opposite to the first surface of the liquid lens. When an operating voltage is applied through the individual terminal and the common terminal, the interface between the conductive liquid and the non-conductive liquid disposed in the lens region may be deformed.

One side of the liquid lens may receive a voltage from an individual terminal. The other side of the liquid lens may receive a voltage from a common terminal. In the present embodiment, the individual terminal of the liquid lens may be an individual electrode, and the common terminals may be a common electrode. Or, the individual terminal of the liquid lens may be a common electrode and the common terminal may be an individual electrode. In the liquid lens, the interface formed between the conductive liquid and the non-conductive liquid may be deformed by currents and/or voltages applied to the individual terminal and the common terminal. Through this, any one or more of the AF function and the OIS function may be performed.

The fourth lens 400 may comprise a first plate 410. The first plate 410 may be spaced apart from the second plate 440. The first plate 410 may be spaced apart from the second plate 440 in the optical axis direction. The first plate 410 may be disposed closer to the object side than the second plate 440. The first plate 410 may cover the object side surface of the first liquid 420. The first plate 410 may be formed of a flat plate. The first plate 410 may have refractive power of '0'. The first plate 410 may be in contact with the first liquid 420. The distance between the first plate 410 and the third lens 300 in the optical axis may be smaller than the distance between the second plate 440 and the fifth lens 500 in the optical axis. The length of the first plate 410 in a direction perpendicular to the optical axis may correspond to a length of the second plate 440 in a corresponding direction.

The fourth lens 400 may comprise a second plate 440. The second plate 440 may be spaced apart from the first plate 410. The second plate 440 may be spaced apart from the first plate 410 in the optical axis direction. The second plate 440 may be disposed closer to the image side than the first plate 410. The second plate 440 may cover the image side surface of the second liquid 430. The second plate 440 may be formed of a flat plate. The second plate 440 may have refractive power of '0'. The second plate 440 may be in contact with the second liquid 430. The length of the second plate 440 in a direction perpendicular to the optical axis may correspond to a length of the first plate 410 in a corresponding direction.

The liquid lens may comprise a first liquid 420. The first liquid 420 may be disposed between the first plate 410 and the second plate 440. The first liquid 420 may have conductivity.

The liquid lens may comprise a second liquid 430. The second liquid 430 may be disposed between the first plate 410 and the second plate 440. The second liquid 430 may have non-conductivity.

The refractive power of the fourth lens 400 may be varied within a range of −50 diopters to 100 diopters.

The imaging lens may comprise a fifth lens 500. The fifth lens 500 may be a lens disposed second from the image side. The fifth lens 500 may be a lens that is second adjacent to the image side. The fifth lens 500 may be disposed between the fourth lens 400 and the image side. The fifth lens 400 may be disposed between the fourth lens 400 and the sixth lens 600. A lens may be additionally disposed between the fifth lens 500 and the fourth lens 400 or between the fifth lens 500 and the sixth lens 600.

The fifth lens 500 may have negative (−) refractive power. Both surfaces of the fifth lens 500 may be formed to be concave. The fifth lens 500 may be formed to be concave on both sides of the optical axis. The fifth lens 500 may comprise an object side surface having a concave shape. The fifth lens 500 may comprise an object side surface having a concave shape in the optical axis. The fifth lens 500 may comprise an image side surface having a concave shape. The fifth lens 500 may comprise an image side surface having a concave shape in the optical axis. The image side surface of the fifth lens 500 may comprise at least one inflection point. The image side surface of the fifth lens 500 may be concave around the optical axis and convex as it moves away from the optical axis. The image side surface of the fifth lens 500 may comprise a portion formed to be convex toward the image side as the distance from the optical axis increases.

The radius of curvature of the object side surface of the fifth lens 500 may be negative. The radius of curvature in the optical axis of the object side surface of the fifth lens 500 may be negative. The radius of curvature of the image side surface of the fifth lens 500 may be positive. The radius of curvature in the optical axis of the image side surface of the fifth lens 500 may be positive. The absolute value of the radius of curvature of the object side surface of the fifth lens 500 may be greater than the absolute value of the radius of curvature of the image side surface of the fifth lens 500. The fifth lens 500 may be a solid lens.

The fifth lens 500 may satisfy a range of 1.5<N5<1.6. In addition, the fifth lens 500 may satisfy a range of 1.51<N5<1.58. N5 is the refractive index of the fifth lens 500. The fifth lens 500 may satisfy the range of 50<V5<60. In addition, the fifth lens 500 may satisfy a range of 53<V5<58. V5 is an Abbe number (Abbe #) of the fifth lens 500.

The imaging lens may comprise a sixth lens 600. The sixth lens 600 may be the lens closest to the image side. The sixth lens 600 may be disposed between the fifth lens 500 and the image side. The sixth lens 600 may be disposed between the fifth lens 500 and the filter 700. A lens may be additionally disposed between the sixth lens 600 and the fifth lens 500 or between the sixth lens 600 and the filter 700.

The sixth lens 600 may have positive (+) refractive power. The sixth lens 600 may be formed to have a concave object side surface. The sixth lens 600 may be formed to have an object side surface concave in the optical axis. The sixth lens 600 may comprise an object side surface having a concave shape. The sixth lens 600 may comprise an object side surface having a concave shape in the optical axis. The sixth lens 600 may be formed to have a convex image side surface. The sixth lens 600 may be formed to have an image side surface convex in the optical axis. The sixth lens 600 may comprise a convex image side surface. The sixth lens 600 may comprise an image side surface that is convex in the optical axis.

The radius of curvature of the object side surface of the sixth lens 600 may be negative. The radius of curvature in the optical axis of the object side surface of the sixth lens 600 may be negative. The radius of curvature of the image side surface of the sixth lens 600 in the optical axis may be negative. The absolute value of the radius of curvature of the object side surface of the sixth lens 600 may be greater than the absolute value of the radius of curvature of the image side surface of the sixth lens 600. The sixth lens 600 may be a solid lens.

The sixth lens 600 may satisfy a range of 1.6<N6<1.7. In addition, the sixth lens 600 may satisfy the range of 1.64<N6<1.68. N6 is the refractive index of the sixth lens 600. The sixth lens 600 may satisfy a range of 20<V6<30. In addition, the sixth lens 600 may satisfy a range of 20<V6<25. V6 is an Abbe number (Abbe #) of the sixth lens 600.

All lens surfaces of the first lens 100, the second lens 200, the third lens 300, the fifth lens 500, and the sixth lens 600 may be formed to be spherical or aspherical surfaces. Both surfaces of each of the first lens 100, the second lens 200, the third lens 300, the fifth lens 500, and the sixth lens 600 may be formed to be spherical surfaces. Both surfaces of each of the first lens 100, the second lens 200, the third lens 300, the fifth lens 500, and the sixth lens 600 may be formed to be aspherical surfaces. Any one surface of the both surfaces of each of the first lens 100, the second lens 200, the third lens 300, the fifth lens 500, and the sixth lens 600 is formed to be a spherical surface, and the other surface may be formed to be an aspherical surface.

The imaging lens may comprise an aperture STOP. The aperture STOP may be disposed between the second lens 200 and the third lens 300. The aperture STOP may be disposed closer to the second lens 200 than the third lens 300. The aperture STOP may be spaced apart from the object side surface of the third lens 300. The aperture STOP may control the amount of light incident from the subject. The aperture STOP may adjust the amount of light passing through the second lens 200. The aperture STOP may adjust the amount of light incident to the third lens 300. The aperture STOP may comprise an aperture stop.

The imaging lens according to the first embodiment of the present invention may satisfy the following Conditional Expression 1 to Conditional Expression 10.

Conditional Expressions and Embodiments described below are preferred embodiments for increasing the effect, and the present invention does not necessarily consist of the following conditions. For example, the configuration of the optical device of the present invention may have a synergistic effect even by satisfying only some Conditional Expressions among Conditional Expressions described below.

$F1/TTL > 0.4$ [Conditional Expression 1]

In Conditional Expression 1, F1 means the focal length of the first lens 100, and TTL means the distance from the vertex of the object side surface of the first lens 100 to the imaging plane in the optical axis.

THI>0.5 mm                    [Conditional Expression 2]

In Conditional Expression 2, THI means the optical axis distance from the apex of the image side surface of the third lens 300 to the vertex of the object side surface of the fifth lens 500.

THI/TTL>0.1                   [Conditional Expression 3]

In Conditional Expression 3, THI means the distance from the vertex of the image side surface of the third lens 300 to the vertex of the object side surface of the fifth lens 500 in the optical axis, and TTL means the distance from the vertex of the object side surface of the first lens 100 to the imaging plane in the optical axis.

THI/(Y×2)>0.1                 [Conditional Expression 4]

In Conditional Expression 4, THI means the distance from the apex of the image side surface of the third lens 300 to the vertex of the object side surface of the fifth lens 500 in the optical axis, and Y means the distance from the optical axis of the imaging plane to the maximum image height in the vertical direction.

F/TTL>1                       [Conditional Expression 5]

In Conditional Expression 5, F means the entire focal length of the optical system, and TTL means the distance from the vertex of the object side surface of the first lens 100 to the imaging plane in the optical axis.

0.5<TTL/(Y×2)<2               [Conditional Expression 6]

In Conditional Expression 6, TTL means the distance from the vertex of the object side surface of the first lens 100 to the imaging plane in the optical axis, and Y means the distance from the optical axis of the imaging plane to the maximum image height in the vertical direction.

|R2|>2×|R1|                   [Conditional Expression 7]

In Conditional Expression 7, R1 means the radius of curvature of the object side surface of the first lens 100, and R2 means the radius of curvature of the image side surface of the first lens 100.

|R3|/|R4|>1                   [Conditional Expression 8]

In Conditional Expression 8, R3 means the radius of curvature of the object side surface of the second lens 200, and R4 means the radius of curvature of the image side surface of the second lens 200.

|R5|/|R6|>1                   [Conditional Expression 9]

In Conditional Expression 9, R5 means the radius of curvature of the object side surface of the third lens 300, and R6 means the radius of curvature of the image side surface of the third lens 300.

0.05<Power4<0.1               [Conditional Expression 10]

In Conditional Expression 10, Power4 means the reciprocal of the focal length of the fourth lens 400.

The aspherical surface mentioned below can be obtained from Equation 1. E used for the conic constant k and the aspherical coefficients A, B, C, D, E, and F, and the number that follows, represents exponentiation based on a power of ten. For example, E+01 represents $10^1$, and E−02 represents $10^{-2}$.

$$z = \frac{cY^2}{1 + \sqrt{1-(1+K)c^2Y^2}} + AY^4 + BY^4 + CY^4 + DY^4 + EY^4 + FY^4 + \ldots \quad \text{[Equation 1]}$$

Here, z means the distance from the vertex of the lens in the optical axis direction. c means the basic curvature of the lens. Y denotes a distance in a direction perpendicular to the optical axis. K stands for Conic constant. A, B, C, D, and E represent aspheric coefficients.

TABLE 1

| Surface | Radius    | Thickness | Index  | Abbe # |
|---------|-----------|-----------|--------|--------|
| 1*      | 1.7360    | 1.1123    | 1.5343 | 55.656 |
| 2*      | 68.4868   | 0.1068    |        |        |
| 3*      | 21.7931   | 0.2200    | 1.6613 | 20.348 |
| 4*      | 6.2788    | 0.1198    |        |        |
| STOP    | infinity  | 0.1155    |        |        |
| 6*      | 17.1336   | 0.2200    | 1.6613 | 20.348 |
| 7*      | 4.4494    | 0.4567    |        |        |
| 8       | infinity  |           |        |        |
| 9       | infinity  |           |        |        |
| 10      | variable  |           |        |        |
| 11      | infinity  |           |        |        |
| 12      | infinity  | 0.8296    |        |        |
| 13*     | −14.8144  | 0.2300    | 1.5343 | 55.656 |
| 14*     | 2.9578    | 0.7966    |        |        |
| 15*     | −11.3168  | 0.7633    | 1.6613 | 20.348 |
| 16*     | −5.2721   | 0.1000    |        |        |
| 17      | infinity  | 0.1100    | 1.523  | 54.5   |
| 18      | infinity  | 0.5200    |        |        |
| Image   | infinity  |           |        |        |

Table 1 shows the surface number (Surface), the radius of curvature (Radius), the center thickness of each lens or the distance between the lens surfaces (Thickness), the refractive index (Index), the Abbe's number (Abbe #) of the imaging lens according to the first embodiment of the present invention. In this case, the unit of the radius of curvature and the thickness or distance may be mm.

TABLE 2

|   | 1*          | 2*          | 3*          | 4*          | 6*          |
|---|-------------|-------------|-------------|-------------|-------------|
| K | 0.019401663 | 0           | 0           | 5.258891888 | 0           |
| A | −0.00390803 | 0.018696726 | 0.023600894 | −0.00228957 | −0.02681097 |
| B | 0.007944106 | 0.082079207 | 0.183125807 | 0.184790968 | 0.163997991 |
| D | −0.03510082 | −0.45163216 | −1.11394708 | −1.25271281 | −1.18498826 |
| E | 0.077488292 | 1.007126127 | 2.916955773 | 3.933294366 | 4.808204599 |
| F | −0.10228883 | −1.21671325 | −4.11922132 | −6.53931585 | −10.727718  |
| G | 0.081020834 | 0.851454536 | 3.337608406 | 6.034782768 | 13.65176991 |
| H | −0.03773745 | −0.34529335 | −1.5507238  | −3.05716893 | −9.92761873 |
| I | 0.009511147 | 0.075393601 | 0.384001914 | 0.772824278 | 3.847889111 |
| J | −0.00100647 | −0.00686857 | −0.03922952 | −0.07133825 | −0.6174167  |

TABLE 2-continued

|   | 7* | 13* | 14* | 15* | 16* |
|---|---|---|---|---|---|
| K | 0 | 0 | 1.449114725 | 0 | 0 |
| A | 0.015451385 | −0.28646046 | −0.22764891 | 0.030933954 | −0.01694175 |
| B | 0.177970232 | 0.070372489 | 0.025101191 | −0.02338196 | 0.031021256 |
| D | −1.47061186 | 0.054471819 | 0.416874856 | 0.014327233 | −0.0631265 |
| E | 7.229188413 | 0.364309599 | −0.98561 | 0.009508816 | 0.068591647 |
| F | −19.6128376 | −2.01553182 | 1.211422276 | −0.01898236 | −0.04029437 |
| G | 30.8430144 | 3.889776499 | −0.89506317 | 0.011421167 | 0.013619767 |
| H | −28.0192476 | −3.80011321 | 0.398083239 | −0.00345175 | −0.00266802 |
| I | 13.66074865 | 1.899898265 | −0.09802625 | 0.000533978 | 0.000281596 |
| J | −2.76554001 | −0.38806794 | 0.010223849 | −3.37E−05 | −1.23E−05 |

Table 2 shows the values of the aspheric coefficient and the conic constant (k) of each lens surface of the imaging lens according to a first embodiment of the present invention Hereinafter, a configuration of an imaging lens according to a second embodiment of the present invention will be described with reference to the drawings.

Figure 2:
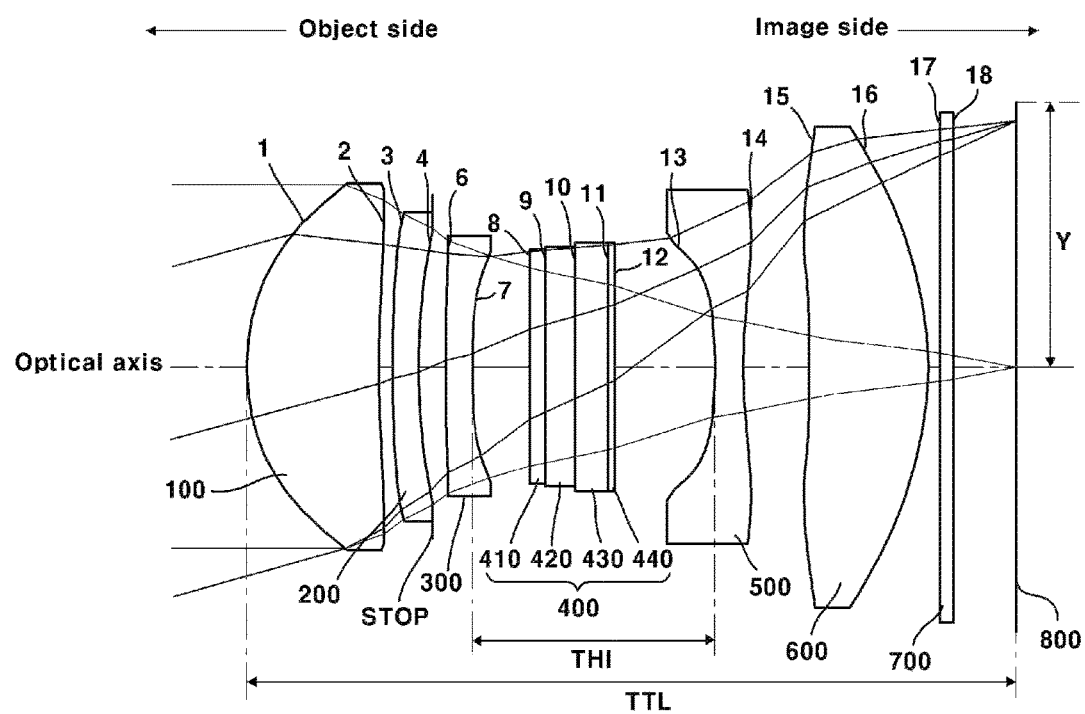
FIG. 2 is a block diagram of an imaging lens according to a second embodiment of the present invention.
Figure 3:
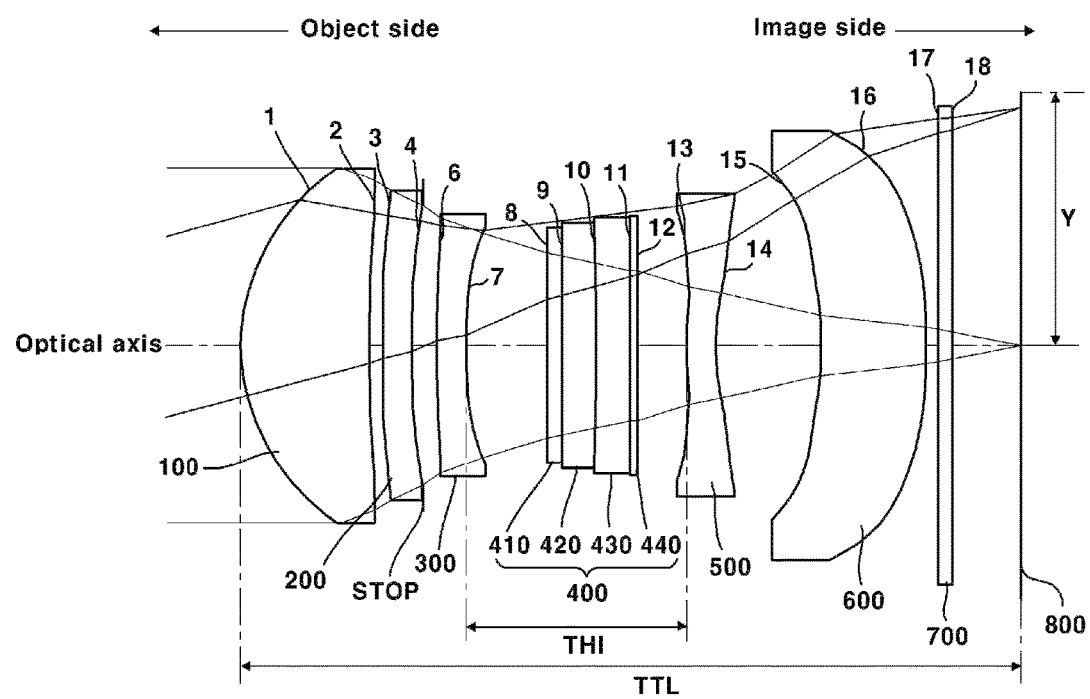
FIG. 3 is a block diagram of an imaging lens according to a third embodiment of the present invention.

FIG. 2 is a block diagram of an imaging lens according to a second embodiment of the present invention.

The imaging lens according to a second embodiment of the present invention may comprise a plurality of lenses. The imaging lens may comprise six lenses. The imaging lens may comprise a first lens 100, a second lens 200, a third lens 300, a fourth lens 400, a fifth lens 500, a sixth lens 600, and an aperture STOP. However, in the imaging lens according to the second embodiment, any one or more among the first lens 100, the second lens 200, the third lens 300, the fourth lens 400, the fifth lens 500, the sixth lens 600, and the aperture STOP may be omitted. The imaging lens may be disposed with a first lens 100, a second lens 200, an aperture STOP, a third lens 300, a fourth lens 400, a fifth lens 500, and a sixth lens 600, in order from the object side to the image side. The imaging lens according to the second embodiment may be composed of 5 or less lenses. Or, the imaging lens according to a second embodiment may be composed of seven or more lenses.

In another embodiment, any one or more among another lens, a flat plate, and an optical member may be added between the first lens 100 to the sixth lens 600. In addition, any one or more among another lens, a flat plate, and an optical member may be added in front of the first lens 100 or behind the sixth lens 600. In addition, any one or more among another lens, a flat plate, and an optical member may be added between the aperture STOP and the lens, between the lens and the filter 700, and between the filter 700 and the image sensor 800. At this time, the filter 700 may be a flat lens. The refractive power of the flat lens may be '0'. The refractive power of a flat lens may not exist. In addition, a filter layer may be disposed between the aperture STOP and the lens, between the lens and the filter 700, and between the filter 700 and the image sensor 800. In this case, the filter layer can be coated to become a filter.

The imaging lens according to a second embodiment uses the same reference numerals for the imaging lens and the radius of curvature, the center thickness of each lens or the distance between the lens surfaces, the refractive index, the Abbe's number, and the same parts according to a first embodiment, and the description is omitted. For the omitted part among the description of the imaging lens according to a second embodiment, the description of the imaging lens according to the first embodiment may be applied by analogy.

The length of the imaging lens in a direction perpendicular to the optical axis of the first plate 410 according to the second embodiment may be smaller than the length of the second plate 440 in the corresponding direction.

TABLE 3

| Surface | Radius | Thickness | Index | Abbe # |
|---|---|---|---|---|
| 1* | 1.7319 | 1.1018 | 1.5343 | 55.656 |
| 2* | 61.3917 | 0.1066 | | |
| 3* | 19.5875 | 0.2200 | 1.6613 | 20.348 |
| 4* | 6.3645 | 0.1190 | | |
| STOP | infinity | 0.1133 | | |
| 6* | 18.6786 | 0.2200 | 1.6613 | 20.348 |
| 7* | 4.8440 | 0.4829 | | |
| 8 | infinity | | | |
| 9 | infinity | | | |
| 10 | variable | | | |
| 11 | infinity | | | |
| 12 | infinity | 0.8279 | | |
| 13* | −12.4706 | 0.2300 | 1.588 | 28.269 |
| 14* | 2.6746 | 0.5579 | | |
| 15* | −6.4473 | 0.9912 | 1.6714 | 19.238 |
| 16* | −3.2615 | 0.100 | | |
| 17 | infinity | 0.1100 | 1.523 | 54.5 |
| 18 | infinity | 0.5200 | | |
| Image | infinity | | | |

Table 3 shows the surface number (Surface), the radius of curvature (Radius), the center thickness of each lens or the distance between the lens surfaces (Thickness) of the imaging lens according to the first embodiment of the present invention (Thickness), refractive index (Index), Abbe's number (Abbe #). In this case, the unit of the radius of curvature and the thickness or distance may be mm. The first lens 100 of the imaging lens according to the second embodiment may satisfy a range of 50<V1<60. In addition, the first lens 100 may satisfy the range of 53<V1<58. V1 is an Abbe number (Abbe #) of the first lens 100. The second lens 200 may satisfy a range of 20<V2<30. In addition, the second lens 200 may satisfy the range of 20<V2<25. V2 is an Abbe number (Abbe #) of the second lens 200. The third lens 300 may satisfy a range of 20<V3<30. In addition, the third lens 300 may satisfy a range of 20<V3<25. V3 is an Abbe number (Abbe #) of the third lens 300. The fifth lens 500 may satisfy a range of 20<V5<30. In addition, the fifth lens 500 may satisfy a range of 25<V5<30. V5 is an Abbe number (Abbe #) of the fifth lens 500. The sixth lens 600 may satisfy a range of 20<V6<30. In addition, the sixth lens 600 may satisfy a range of 20<V6<25. V6 is an Abbe number (Abbe #) of the sixth lens 600.

TABLE 4

| | 1* | 2* | 3* | 4* | 6* |
|---|---|---|---|---|---|
| K | 0.018131788 | 0 | 0 | 5.324117955 | 0 |
| A | −0.00396959 | 0.015600178 | 0.020246659 | −0.00201427 | −0.02405421 |
| B | 0.006773415 | 0.10519265 | 0.209258623 | 0.187271848 | 0.138796238 |
| D | −0.03028437 | −0.53022441 | −1.21214184 | −1.26883782 | −1.0613965 |
| E | 0.067202918 | 1.15374973 | 3.117039455 | 3.980787552 | 4.448069297 |
| F | −0.09002863 | −1.37952452 | −4.36068561 | −6.62756251 | −10.0709565 |
| G | 0.072460088 | 0.962394702 | 3.515935556 | 6.145359333 | 12.90289127 |
| H | −0.03425135 | −0.39089226 | −1.63020192 | −3.14615067 | −9.41316187 |
| I | 0.00874404 | 0.085780931 | 0.40373008 | 0.813238587 | 3.654759665 |
| J | −0.00093616 | −0.00787595 | −0.04133466 | −0.07909452 | −0.58729029 |

| | 7* | 13* | 14* | 15* | 16* |
|---|---|---|---|---|---|
| K | 0 | 0 | 1.432976403 | 0 | 0 |
| A | 0.014811846 | −0.3360256 | −0.23875224 | 0.054211092 | −0.00900112 |
| B | 0.164727265 | 0.27010451 | 0.097828991 | −0.05011846 | 0.006709585 |
| D | −1.42534145 | −0.93599683 | 0.252545945 | 0.08351294 | −0.01826906 |
| E | 7.158248729 | 3.563518486 | −0.71769589 | −0.07671642 | 0.023222509 |
| F | −19.6264634 | −8.80635069 | 0.883778756 | 0.039154062 | −0.01220444 |
| G | 31.08700029 | 13.02158506 | −0.62307891 | −0.01167919 | 0.002828726 |
| H | −28.4259615 | −11.2225971 | 0.258540309 | 0.002002338 | −0.00015942 |
| I | 13.95725191 | 5.219420267 | −0.05879985 | −0.00017775 | −4.15E−05 |
| J | −2.84949782 | −1.01596729 | 0.005649132 | 5.96E−06 | 5.36E−06 |

Table 4 shows the values of the aspheric coefficient and the conic constant (k) of each lens surface of the imaging lens according to a first embodiment of the present invention.

Hereinafter, a configuration of an imaging lens according to a third embodiment of the present invention will be described with reference to the drawings.

FIG. 2 is a block diagram of an imaging lens according to a third embodiment of the present invention.

The imaging lens according to a third embodiment of the present invention may comprise a plurality of lenses. The imaging lens may comprise six lenses. The imaging lens may comprise a first lens 100, a second lens 200, a third lens 300, a fourth lens 400, a fifth lens 500, a sixth lens 600, and an aperture STOP. However, in the imaging lens according to the third embodiment, any one or more among the first lens 100, the second lens 200, the third lens 300, the fourth lens 400, the fifth lens 500, the sixth lens 600, and the aperture STOP may be omitted. The imaging lens may be disposed with a first lens 100, a second lens 200, an aperture STOP, a third lens 300, a fourth lens 400, a fifth lens 500, and a sixth lens 600, in order from the object side to the image side. The imaging lens according to the second embodiment may be composed of 5 or less lenses. Or, the imaging lens according to a second embodiment may be composed of seven or more lenses.

In another embodiment, any one or more among another lens, a flat plate, and an optical member may be added between the first lens 100 to the sixth lens 600. In addition, any one or more among another lens, a flat plate, and an optical member may be added in front of the first lens 100 or behind the sixth lens 600. In addition, any one or more among another lens, a flat plate, and an optical member may be added between the aperture STOP and the lens, between the lens and the filter 700, and between the filter 700 and the image sensor 800. In this case, the filter 700 may be a flat lens. The refractive power of the flat lens may be '0'. The refractive power of a flat lens may not exist. In addition, a filter layer may be disposed between the aperture STOP and the lens, between the lens and the filter 700, and between the filter 700 and the image sensor 800. In this case, the filter layer can be coated to become a filter.

The imaging lens according to a third embodiment uses the same reference numerals for the imaging lens and the radius of curvature, the center thickness of each lens or the distance between the lens surfaces, the refractive index, the Abbe's number, and the same parts according to a first embodiment, and the description is omitted. For the omitted part among the description of the imaging lens according to a third embodiment, the description of the imaging lens according to the first embodiment may be applied by analogy.

The distance between the first plate 410 and the third lens 300 of the imaging lens according to the third embodiment in the optical axis may be greater than the distance between the second plate 440 and the fifth lens 500 in the optical axis. The length of the first plate 410 in a direction perpendicular to the optical axis may be smaller than the length of the second plate 440 in a corresponding direction.

TABLE 5

| Surface | Radius | Thickness | Index | Abbe # |
|---|---|---|---|---|
| 1* | 1.6133 | 0.9854 | 1.5343 | 55.656 |
| 2* | 20.9832 | 0.1000 | | |
| 3* | 112.1656 | 0.2200 | 1.6613 | 20.348 |
| 4* | 8.0110 | 0.1000 | | |
| STOP | infinity | 0.1000 | | |
| 6* | 11.6129 | 0.2200 | 1.6613 | 20.348 |
| 7* | 4.2702 | 0.6280 | | |
| 8 | infinity | | | |
| 9 | infinity | | | |
| 10 | variable | | | |
| 11 | infinity | | | |
| 12 | infinity | 0.3767 | | |
| 13* | 5.7498 | 0.2300 | 1.5343 | 55.656 |
| 14* | 2.2602 | 0.7994 | | |
| 15* | −4.5328 | 0.8110 | 1.6613 | 20.348 |
| 16* | −5.2109 | 0.1000 | | |
| 17 | infinity | 0.1100 | 1.523 | 54.5 |
| 18 | infinity | 0.5200 | | |
| Image | infinity | | | |

Table 5 shows the surface number (Surface), the radius of curvature (Radius), the center thickness of each lens or the distance between the lens surfaces (Thickness) of the imaging lens according to the first embodiment of the present invention (Thickness), refractive index (Index), Abbe's number (Abbe #). In this case, the unit of the radius of curvature and the thickness or distance may be mm. The object side surface of the fifth lens 500 of the imaging lens according to the third embodiment may be formed to be convex. The object side surface of the fifth lens 500 may be formed to be convex in the optical axis. The fifth lens 500 may comprise an object side surface having a convex shape. The fifth lens 500 may comprise an object side surface having a convex shape in the optical axis. The image side surface of the fifth lens 500 may be formed to be concave. The image side surface of the fifth lens 500 may be formed to be concave in the optical axis. The fifth lens 500 may comprise a concave image side surface. The fifth lens 500 may comprise an image side surface concave in the optical axis.

The radius of curvature of the object side surface of the fifth lens 500 of the imaging lens according to a third embodiment may be positive. The radius of curvature in the optical axis of the object side surface of the fifth lens 500 may be positive. The radius of curvature of the image side surface of the fifth lens 500 may be positive. The radius of curvature of the image side surface of the fifth lens 500 in the optical axis may be positive.

TABLE 6

| | 1* | 2* | 3* | 4* | 6* |
|---|---|---|---|---|---|
| K | 0.028685349 | 0 | 0 | 6.610541343 | 0 |
| A | −0.00390143 | 0.006132685 | 0.021739288 | 0.004900509 | −0.01082727 |
| B | 0.0088816 | 0.237884405 | 0.30230533 | 0.184080683 | 0.044021764 |
| D | −0.03665195 | −1.34672182 | −2.05106819 | −1.67755983 | −0.88574545 |
| E | 0.08165951 | 3.589529662 | 6.440849551 | 6.968627061 | 5.500060093 |
| F | −0.12252233 | −5.33233919 | −11.0862382 | −15.3570986 | −16.5292469 |
| G | 0.118661338 | 4.641561853 | 11.04163078 | 19.05200518 | 26.89356302 |
| H | −0.07013482 | −2.35482086 | −6.35520313 | −13.4194782 | −24.3899198 |
| I | 0.02278298 | 0.645345205 | 1.967022889 | 5.030631386 | 11.65359079 |
| J | −0.00313676 | −0.07394107 | −0.25398069 | −0.78237572 | −2.29507499 |

| | 7* | 13* | 14* | 15* | 16* |
|---|---|---|---|---|---|
| K | 0 | 0 | 1.365246295 | 0 | 0 |
| A | 0.042007866 | −0.20075531 | −0.17489468 | −0.07375795 | −0.09955611 |
| B | 0.103764193 | 0.25422684 | 0.117561938 | 0.392665752 | 0.216331697 |
| D | −1.30328923 | −1.20069799 | −0.31921764 | −1.41916272 | −0.43668943 |
| E | 8.45886102 | 3.760397557 | 0.668132206 | 3.160570401 | 0.558637021 |
| F | −28.403368 | −7.6850274 | −1.09086246 | −4.44358598 | −0.45231183 |
| G | 54.01187748 | 10.13784759 | 1.298297354 | 3.910149158 | 0.228844816 |
| H | −58.5437848 | −8.21456228 | −1.00132187 | −2.09238103 | −0.0702546 |
| I | 33.82212241 | 3.735875551 | 0.445898745 | 0.620049761 | 1.19E−02 |
| J | −8.08662534 | −0.73414229 | −0.08629306 | −7.76E−02 | −8.58E−04 |

Table 6 shows the values of the aspheric coefficient and the conic constant (k) of each lens surface of the imaging lens according to a first embodiment of the present invention.

TABLE 7

| | First embodiment | Second embodiment | Third embodiment |
|---|---|---|---|
| F1 | 3.30 | 3.30 | 3.20 |
| F | 7.49 | 7.49 | 6.76 |
| THI | 1.99 | 2.01 | 1.70 |
| TTL | 6.40 | 6.40 | 6.00 |
| Y | 2.04 | 2.04 | 1.84 |
| F1/TTL | 0.52 | 0.52 | 0.53 |
| F/TTL | 1.17 | 1.17 | 1.13 |
| THI/TTL | 0.31 | 0.31 | 0.28 |
| THI/(Y × 2) | 0.49 | 0.49 | 0.46 |
| TTL/(Y × 2) | 1.57 | 1.57 | 1.63 |

TABLE 7-continued

| | First embodiment | Second embodiment | Third embodiment |
|---|---|---|---|
| R1 | 1.74 | 1.73 | 1.61 |
| R2 | 68.49 | 61.39 | 20.98 |
| R3 | 21.79 | 19.59 | 112.17 |
| R4 | 6.28 | 6.36 | 8.01 |
| R5 | 17.13 | 18.68 | 11.61 |
| R6 | 4.45 | 4.84 | 4.27 |

Referring to Table 7, it can be seen that the first to third embodiments of the present invention satisfy all of Conditional Expressions 1 to 10. In addition, the first to third embodiments of the present invention may satisfy 2.5<F1<4.0, 6.0<F<8.0, 5.5<TTL<7.0, and 1.0<Y<2.5. Or, in the first to third embodiments of the present invention, 3<F1<3.5, 6.6<F<7.6, 5.8<TTL<6.5, and 1.7<Y<2.1 may be satisfied. In addition, the first to third embodiments of the present invention are 1.5<THI<2.1, 0.5<F1/TTL<0.6, 1.1<F/TTL<1.2, 0.25<THI/TTL<0.35, 0.4<THI/(Y×2)<0.5, 1.5<TTL/(Y×2)<1.7, |R3|/|R4|>3, |R5|/|R6|>2.5 can be satisfied. In this case, the units of F1, F, THI, TTL, Y, R1, R2, R3, R4, R5, and R6 may be mm.

Hereinafter, a camera module according to an embodiment of the present invention will be described with reference to the drawings.

Figure 4:
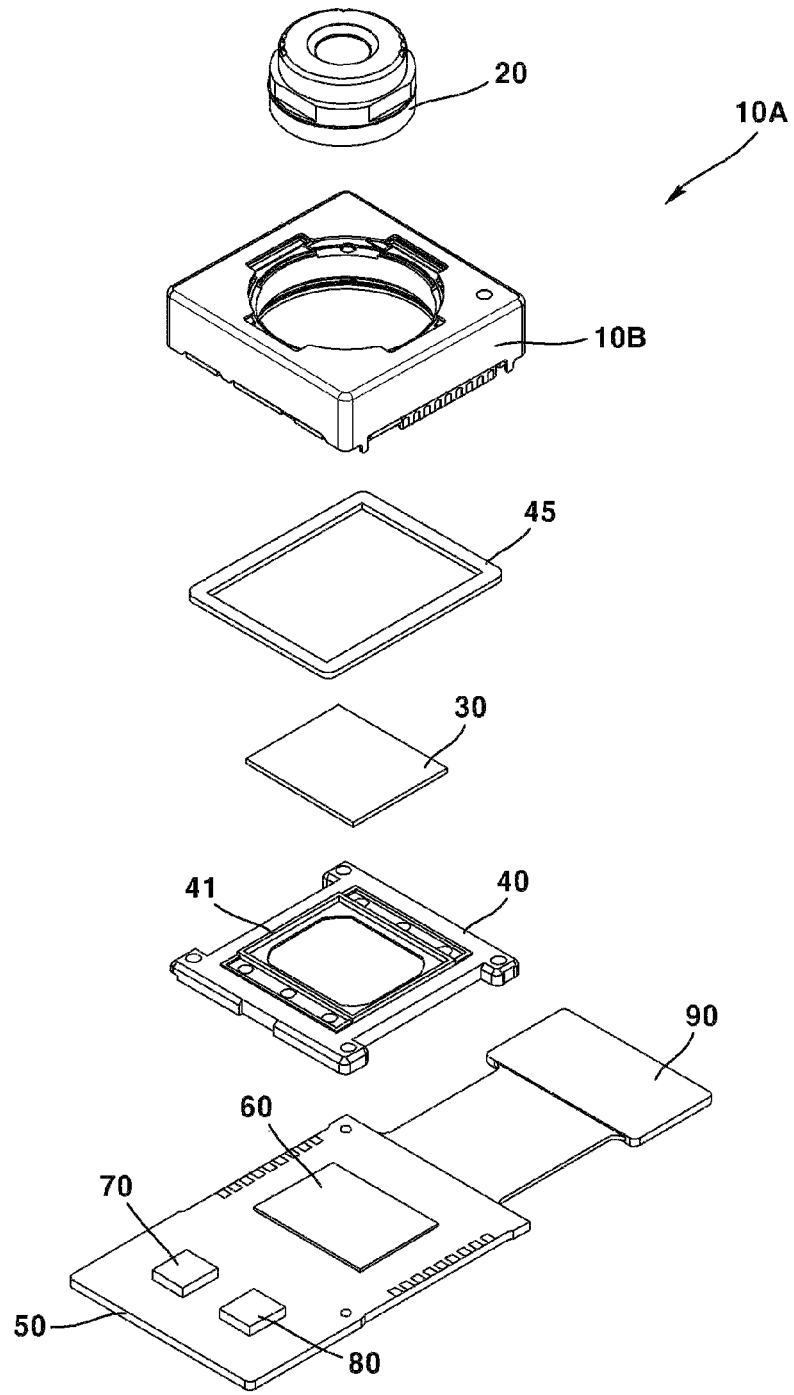
FIG. 4 is an exploded perspective view of a camera device according to an embodiment of the present invention.

FIG. 4 is an exploded perspective view of a camera device according to an embodiment of the present invention.

The camera device 10A may comprise a camera module.

The camera device 10A may comprise a lens module 20. The lens module 20 may comprise at least one lens. The lens may be disposed at a position corresponding to an image sensor 60. The lens module 20 may comprise a lens and a barrel. The lens module 20 may be coupled to a bobbin 210 of the lens driving device 10B. The lens module 20 may be coupled to the bobbin 210 by screw-coupling and/or adhesive. The lens module 20 may move integrally with the bobbin 210.

The camera device 10A may comprise a filter 30. The filter 30 may serve to block light of a specific frequency band from being incident on the image sensor 60 from the light passing through the lens module 20. The filter 30 may be disposed to be parallel to the x-y plane. The filter 30 may be disposed between the lens module 20 and the image sensor 60. The filter 30 may be disposed on a sensor base 40. As a modified embodiment, the filter 30 may be disposed on a base of the lens driving device 10B. The filter 30 may comprise an infrared filter. The infrared filter may block light in the infrared region from being incident on the image sensor 60.

The camera device 10A may comprise a sensor base 40. The sensor base 40 may be disposed between the lens driving device 10B and a printed circuit board 50. The sensor base 40 may comprise a protrusion 41 on which the filter 30 is disposed. An opening may be formed in a portion of the sensor base 40 where the filter 30 is disposed so that light passing through the filter 30 may be incident on the image sensor 60. The adhesive member 45 may couple or attach the base 410 of the lens driving device 10B to the sensor base 40. The adhesive member 45 may additionally serve to prevent foreign substances from being introduced into the lens driving device 10B. The adhesive member 45 may comprise any one or more among an epoxy, a thermosetting adhesive, and an ultraviolet curable adhesive.

The camera device 10A may comprise a printed circuit board (PCB) 50. The printed circuit board 50 may be a substrate or a circuit board. A lens driving device 10B may be disposed on the printed circuit board 50. The sensor base 40 may be disposed between the printed circuit board 50 and the lens driving device 10B. The printed circuit board 50 may be electrically connected to the lens driving device 10B. The image sensor 60 may be disposed on the printed circuit board 50. The printed circuit board 50 may be provided with various circuits, elements, control units, and the like to convert an image formed on the image sensor 60 into an electrical signal and transmit it to an external device.

The camera device 10A may comprise an image sensor 60. The image sensor 60 may have a configuration in which light passing through the lens and filter 30 is incident to form an image. The image sensor 60 may be mounted on the printed circuit board 50. The image sensor 60 may be electrically connected to the printed circuit board 50. For example, the image sensor 60 may be coupled to the printed circuit board 50 by a surface mounting technology (SMT). As another example, the image sensor 60 may be coupled to the printed circuit board 50 by a flip chip technology. The image sensor 60 may be disposed so that the lens and the optical axis coincide. That is, the optical axis of the image sensor 60 and the optical axis of the lens may be aligned. The image sensor 60 may convert light irradiated to the effective image area of the image sensor 60 into an electrical signal. The image sensor 60 may be any one among a charge coupled device (CCD), a metal oxide semi-conductor (MOS), a CPD, and a CID.

The camera device 10A may comprise a motion sensor 70. The motion sensor 70 may be mounted on the printed circuit board 50. The motion sensor 70 may be electrically connected to a control unit 80 through a circuit pattern provided on the printed circuit board 50. The motion sensor 70 may output rotational angular velocity information due to the movement of the camera device 10A. The motion sensor 70 may comprise a 2-axis or 3-axis gyro sensor, or an angular velocity sensor.

The camera device 10A may comprise a control unit 80. The control unit 80 may be disposed on the printed circuit board 50. The control unit 80 may be electrically connected to the AF coil and the OIS coil of the lens driving device 10B. The control unit 80 may individually control the direction, intensity, and amplitude of the current supplied to the AF coil and the OIS coil. The control unit 80 may control the lens driving device 10B to perform an autofocus function and/or a handshake correction function. Furthermore, the control unit 80 may perform auto focus feedback control and/or handshake correction feedback control for the lens driving device 10B.

The camera device 10A may comprise a connector 90. The connector 90 may be electrically connected to the printed circuit board 50. The connector 90 may comprise a port for electrically connecting to an external device.

Although embodiments of the present invention have been described with reference to the accompanying drawings, those of ordinary skill in the art to which the present invention belongs will be able to understand that the present invention can be embodied in other specific forms without changing its technical spirit or essential features. Therefore, it should be understood that the embodiments described above are illustrative in all respects and not restrictive.

The invention claimed is:

1. An imaging lens comprising:
   a first lens having positive (+) refractive power;
   a second lens having negative (−) refractive power;
   a third lens having negative (−) refractive power;
   a fourth lens;
   a fifth lens having negative (−) refractive power; and
   a sixth lens,
   wherein the first to sixth lenses are successively disposed from an object side to an image side along an optical axis,
   wherein each of the first to third lenses, the fifth lens, and the sixth lens is a solid lens,
   wherein the fourth lens comprises a focus-tunable lens, and
   wherein the imaging lens satisfies Conditional Expression 1 below:

$$F1/TTL > 0.4 \qquad \text{[Conditional Expression 1]}$$

where F1 is a focal length of the first lens, and TTL is a distance from a vertex of an object side surface of the first lens to an imaging plane at the optical axis.

2. The imaging lens of claim 1, wherein the sixth lens has positive (+) refractive power.

3. The imaging lens of claim 1, further comprising an aperture disposed between the second lens and the third lens.

4. The imaging lens of claim 1, wherein the object side surface of the first lens is convex, and an image side surface of the first lens is concave.

5. The imaging lens of claim 1, wherein an object side surface of the second lens is convex, and an image side surface of the second lens is concave.

6. The imaging lens of claim 1, wherein an object side surface of the third lens is convex, and an image side surface of the third lens is concave.

7. The imaging lens of claim 1, wherein both surfaces of the fifth lens are concave at the optical axis.

8. The imaging lens of claim 1, wherein an object side surface of the sixth lens is concave at the optical axis and an image side surface of the sixth lens is convex.

9. The imaging lens of claim 1, wherein a refractive power of the fourth lens is varied within a range of −50 diopters to 100 diopters.

10. The imaging lens of claim 1, wherein the focus-tunable lens comprises a liquid lens,
    wherein the liquid lens comprises a first plate, a second plate spaced apart from the first plate and disposed closer to an image side than being the first plate, a conductive liquid disposed between the first plate and the second plate, and a non-conductive liquid disposed between the first plate and the second plate, wherein the liquid lens comprises an interface formed by the first liquid and the second liquid being in contact with each other, wherein a curvature of the interface of the liquid lens is varied by an applied voltage, and wherein each of the first plate and the second plate is formed as a flat plate.

11. The imaging lens of claim 1, wherein the imaging lens satisfies Conditional Expression 2 below:

$$THI>0.5 \text{ mm} \quad \text{[Conditional Expression 2]}$$

where THI is a distance from a vertex of an image side surface of the third lens to a vertex of an object side surface of the fifth lens at the optical axis.

12. The imaging lens of claim 1, wherein the imaging lens satisfies Conditional Expression 3 below:

$$THI/TTL>0.1 \quad \text{[Conditional Expression 3]}$$

where THI is a distance from a vertex of an image side surface of the third lens to a vertex of an object side surface of the fifth lens at the optical axis.

13. The imaging lens of claim 1, wherein the imaging lens satisfies Conditional Expression 4 below:

$$THI/(Y\times2)>0.1 \quad \text{[Conditional Expression 4]}$$

where THI is a distance from a vertex of an image side surface of the third lens to a vertex of an object side surface of the fifth lens at the optical axis, and Y is a distance from the optical axis of the imaging plane to a maximum image height in a vertical direction.

14. The imaging lens of claim 1, wherein the imaging lens satisfies Conditional Expression 5 below:

$$F/TTL>1 \quad \text{[Conditional Expression 5]}$$

where F is an entire focal length of an optical system.

15. The imaging lens of claim 1, wherein the imaging lens satisfies Conditional Expression 6 below:

$$0.5<TTL/(Y\times2)<2 \quad \text{[Conditional Expression 6]}$$

where Y is a distance from the optical axis of the imaging plane to a maximum image height in a vertical direction.

16. The imaging lens of claim 1, wherein the imaging lens satisfies Conditional Expression 7 below:

$$|R2|>2\times|R1| \quad \text{[Conditional Expression 7]}$$

where R1 is a radius of curvature of the object side surface of the first lens, and R2 is a radius of curvature of an image side surface of the first lens.

17. A camera module comprising:
an image sensor;
an imaging lens of claim 1; and
a filter disposed between the image sensor and the imaging lens.

18. The imaging lens of claim 1, wherein the imaging lens satisfies Conditional Expression 8 below:

$$|R3|/|R4|>1 \quad \text{[Conditional Expression 8]}$$

where R3 means a radius of curvature of an object side surface of the second lens, and R4 means a radius of curvature of an image side surface of the second lens.

19. An imaging lens comprising:
a first lens having positive (+) refractive power;
a second lens having negative (−) refractive power;
a third lens having negative (−) refractive power;
a fourth lens;
a fifth lens having negative (−) refractive power; and
a sixth lens having positive (+) refractive power,
wherein the first to sixth lenses are successively disposed from an object side to an image side along an optical axis,
wherein each of the first to third lenses, the fifth lens, and the sixth lens is a solid lens,
wherein the fourth lens comprises a focus-tunable lens,
wherein the imaging lens satisfies Conditional Expression 2 below:

$$THI>0.5 \text{ mm} \quad \text{[Conditional Expression 2]}$$

where THI is a distance from a vertex of an image side surface of the third lens to a vertex of an object side surface of the fifth lens at the optical axis.

20. An imaging lens comprising:
first to sixth lenses successively disposed from an object side to an image side along an optical axis,
wherein each of the first lens and the sixth lens has positive (+) refractive power,
wherein the second lens has negative (−) refractive power,
wherein the third lens has negative (−) refractive power,
wherein the fifth lens has negative (−) refractive power,
wherein each of the first to third lenses, the fifth lens, and the sixth lens is a solid lens, and
wherein the fourth lens comprises a focus-tunable lens,
wherein the imaging lens satisfies Conditional Expression 3 below, $$THI/TTL>0.1 \quad \text{[Conditional Expression 3]}$$

where THI is a distance from a vertex of an image side surface of the third lens to a vertex of an object side surface of the fifth lens at the optical axis, and TTL is a distance from a vertex of an object side surface of the first lens to an imaging surface at the optical axis.

* * * * *